United States Patent Office 3,047,625
Patented July 31, 1962

3,047,625
NEW N-ARYLSULFO-N'-ALKOXYUREAS
Walter Gauss, Koln-Stammheim, and Siegfried Petersen, Leverkusen, Germany, assignors to Farbenfabriken Bayer Aktiengesellschaft, Leverkusen, Germany, a corporation of Germany
No Drawing. Filed Apr. 19, 1960, Ser. No. 23,136
Claims priority, application Germany Apr. 23, 1959
6 Claims. (Cl. 260—553)

This invention relates in general to novel organic chemical compounds. More particularly, the invention involves the provision of unique urea derivatives in the form of N-arylsulfo-N'-alkoxyureas which are found to possess dramatic blood sugar-lowering action within warm-blooded animals.

The invention is based on our discovery that compounds of the general class described can be produced by reacting arylsulfoisocyanates, or adducts thereof with compounds having an active hydrogen atom (said adducts being cleavable under the reaction conditions employed), with O-alkyl-hydroxylamines or O,N-dialkyl-hydroxylamines. In general, the sulfoisocyanates are caused to react with the alkyl-hydroxylamines within an inert solvent medium such as benzene, toluene, and chorinated hydrocarbons of the aliphatic and aromatic series, among others. This reaction occurs with evolution of heat and the desired end-products separate in crystalline form.

Among the arylsulfoisocyanates which may be employed in the production of compounds of the invention are included: benzene sulfoisocyanate; o-, m- and p-methylbenzene sulfoisocyanates; o-, m- and p-ethylbenzene sulfoisocyanates; and similar o-, m- and p-alkylbenzene sulfoisocyanates having from 3 to 5 carbon atoms in the alkyl radical; halobenzene sulfoisocyanates, such, for example, as o-, m- and p-chlorobenzene sulfoisocyanates or o-, m- and p-bromobenzene sulfoisocyanates; o-, m- and p-nitrobenzene sulfoisocyanates; benzene sulfoisocyanates containing several of the foregoing substituent groups; sulfoisocyanates of the naphthalene series, as well as compounds having several sulfoisocyanate groups.

The O-alkyl-hydroxylamines used in the production of the compounds of our invention can be produced in conventional manner by alkylation with hydroxylamine derivatives having a protected amine group as, for example, from hydroxylamine disulfonic acid, or from hydroxyurethanes. The O-alkylhydroxylamines which are suitable for use in the synthesis of the invention include those in which the alkyl radical contains from 1 to 6 carbon atoms, such as, O-methylhydroxylamine; O-ethylhydroxylamine; O-propylhydroxylamine; O-butylhydroxylamine; O-isobutylhydroxylamine, among others.

Suitable O,N-dialkyl-hydroxylamines for use in our invention are those containing from 1 to 6 carbon atoms in the alkyl groups, such as, for example, dimethyl-, diprpyl-, etc., hydroxylamines. The alkyl substituents on the nitrogen and oxygen can be the same or different in structure.

As pointed out hereinbefore, instead of proceeding from the free sulfoisocyanates, one may employ cleavable adducts of the same with compounds having an active hydrogen atom. For example, arylsulfourethanes derivable from alcohols or phenols, reaction products of arylsulfoisocyanates with malonic ester, acetoacetic ester, etc., may be employed to advantage.

The novel compounds of the invention, which are most accurately termed N-arylsulfo-N'-alkoxyureas, can be employed effectively as oral antidiabetics in addition to their pronounced utility in lowering the blood sugar level.

It is believed that the invention will be best understood by reference to the following specific examples showing the application of the foregoing principles and procedures in the production of a typical compound of the invention:

Example 1

Preparation of the compound N-toluene-sulfo-N'-butoxy carbamide, as represented by the formula:

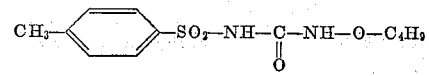

To a mixture consisting of 19.7 grams (0.1 mole) of p-toluenesulfoisocyanate and 100 cubic centimeters of absoluet benzene, there was added dropwise and with stirring and gentle cooling, a mixture composed of 9.8 grams (0.11 mole) of n-butoxyamine and 15 cubic centimeters of absolute benzene. A white crystalline slurry was formed which was further stirred a few hours at room temperature, then separated by suction filtration and washed with benzene. The air-dried end-product of the foregoing formula (about 20 grams) melts at 133–135° C.

$C_{12}H_{18}N_2O_4S$ (286.2):

|  | C | H | N | O | S |
|---|---|---|---|---|---|
| Calculated | 50.31 | 6.34 | 9.79 | 22.36 | 11.20 |
| Found | 50.43 | 6.24 | 9.95 | 22.78 | 10.95 |

Example 2

Preparation of the compound N-benzene-sulfo-N'-n-butoxy carbamide, as represented by the formula:

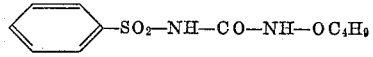

To a mixture consisting of 36.6 grams (0.2 mole) of benzene-sulfo-isocyanate and 100 cubic centimeters of absolute benzene, there was added dropwise and with stirring and gentle cooling within half an hour, a solution of 17.8 g (0.2 mole) of O-n-butyl-hydroxyl amine in 30 cubic centimeters of absolute benzene. Stirring is continued for a further hour at room-temperature, then the mixture is cooled to about +6° C. and the white crystalline slurry is separated by suction, washed with a little benzene and dried. The end-product of the foregoing formula (about 32.5 grams) melts at 120–122° C.

Example 3

Preparation of the compound N-p-toluene-sulfo-N'-methoxy carbamide, as represented by the formula:

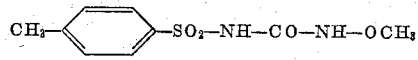

To a mixture consisting of 39.4 grams (0.2 mole) p-toluene-sulfo-isocyanate and 200 cubic centimeters of absolute benzene, there was added dropwise with cooling and stirring within one hour, a mixture consisting of 9.4 grams (0.2 mole) of O-methyl-hydroxyl amine and 50 cubic centimeters of absolute benzene. Stirring was continued with gentle cooling for two further hours, the semi-crystalline white slurry was separated by suction and washed with benzene. After air-drying 38 grams of the product of the foregoing formula is obtained. It melts at 121–124° C. For purification it is crystallized twice from ethyl acetate and 28.2 grams of the purified product melting at 128–129° C. are obtained.

Example 4

Preparation of the compound N-p-chlorobenzene-sulfo-N'-n-butoxy carbamide, as represented by the formula:

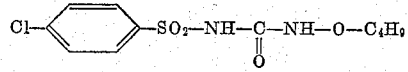

To a mixture consisting of 21.8 grams (0.1 mole) of p-chlorobenzene-sulfo-isocyanate and 80 cubic centimeters of absolute benzene, there was added dropwise and with stirring and cooling within 30 minutes 8.9 grams (0.1 mole) of N-butoxy amine, dissolved in 20 cubic centimeters of absolute benzene. Stirring is continued for 90 minutes at room-temperature and for 30 minutes with cooling. Then the product is separated by suction and washed with benzene. 25.2 grams of a product melting at 136–139° C. are obtained. It is crystallized twice from benzene and 21.7 grams of the purified compound of the foregoing formula melting at 139–141° C. are obtained.

*Example 5*

Preparation of the compound N-p-toluene-sulfo-N'-ethyl-N'-ethoxy carbamide, as represented by the formula:

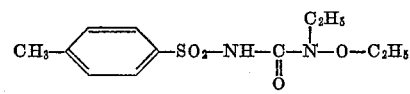

To a mixture consisting of 19.7 grams (0.1 mole) of p-toluene-sulfo-isocyanate and 100 cubic centimeters of absolute benzene, there was added dropwise and with cooling and stirring, a mixture consisting of 8.9 grams (0.1 mole) of O,N-diethyl-hydroxyl amine and 30 cubic centimeters of absolute benzene. From the clear solution benzene is disstilled off in vacuo. The residue is washed by ligroin and dried. 22.5 grams of a product melting at 80–86° C. are obtained. For purification it is crystallized once from ether and twice by ethyl acetate. The pure compound of the foregoing formula (about 18 grams) melts at 93–94° C.

Having thus described the subject matter of our invention, what it is desired to secure by Letters Patent is:

1. A compound selected from the group consisting of N-toluene-sulfo-N'-butoxy carbamide, N-benzene-sulfo-N'-n-butoxy carbamide, N-p-toluene-sulfo-N'-methoxy carbamide, N-p-chlorobenzene-sulfo-N'-n-butoxy carbamide, and N-p-toluene-sulfo-N'-ethyl-N'-ethoxy carbamide.

2. The compound, N-toluene-sulfo-N'-butoxy carbamide.

3. The compound, N-benzene-sulfo-N'-n-butoxy carbamide.

4. The compound, N-p-toluene-sulfo-N'-methoxy carbamide.

5. The compound, N-p-chlorobenzene-sulfo-N'-n-butoxy carbamide.

6. The compound, N-p-toluene-sulfo-N'-ethyl-N'-ethoxy carbamide.

No references cited.